United States Patent
Sugimoto et al.

(10) Patent No.: US 6,389,968 B1
(45) Date of Patent: May 21, 2002

(54) INK SUPPLY CONTROL DEVICE FOR PRINTING MACHINES AND A METHOD THEREFOR

(75) Inventors: Hiroshi Sugimoto; Hideki Ikeda; Yukio Ejiri, all of Fuchu (JP)

(73) Assignee: Ryobi Ltd., Hiroshima-Ken (JP)

( * ) Notice: Subject to any disclaimer, the term of this patent is extended or adjusted under 35 U.S.C. 154(b) by 0 days.

(21) Appl. No.: 09/537,239

(22) Filed: Mar. 28, 2000

(30) Foreign Application Priority Data

Apr. 19, 1999 (JP) ........................................ H11-110871

(51) Int. Cl.$^7$ ................................................. B41F 3/40
(52) U.S. Cl. ..................... 101/365; 101/211; 364/526; 356/407; 395/109; 382/112
(58) Field of Search ................................ 101/365, 366, 101/211; 395/109, 104; 364/526, 519; 358/504; 356/394, 429, 407; 382/112; 250/559.07

(56) References Cited

U.S. PATENT DOCUMENTS

| | | | | |
|---|---|---|---|---|
| 3,376,426 A | * | 4/1968 | Frommer et al. ............ | 250/226 |
| 5,182,721 A | * | 1/1993 | Kipphan et al. ............ | 364/526 |
| 5,791,249 A | * | 8/1998 | Quadracci ................. | 101/450.1 |
| 5,841,955 A | * | 11/1998 | Wang ......................... | 395/109 |
| 5,903,712 A | * | 5/1999 | Wang et al. ................. | 395/109 |
| 5,967,050 A | * | 10/1999 | Seymour ..................... | 101/484 |
| 5,992,318 A | * | 11/1999 | Dibello et al. ............. | 101/181 |
| 6,041,708 A | * | 3/2000 | Kipphan et al. ............ | 101/365 |
| 6,058,201 A | * | 5/2000 | Sikes et al. ................. | 382/112 |

FOREIGN PATENT DOCUMENTS

| | | | |
|---|---|---|---|
| JP | 58-45527 | * | 3/1983 |
| JP | 62-146633 | * | 6/1987 |

* cited by examiner

*Primary Examiner*—Eugene Eickholt
(74) *Attorney, Agent, or Firm*—Merchant & Gould P.C.

(57) ABSTRACT

Solid-patches 11, 12, and 13 each printed with color-inks of cyan, magenta, yellow, and a gray patch 14 included in a color bar 15 are printed on a printed-matter 10. A measuring and calculation device 4 measures actual ink densities at each of the solid-patches and gray patches in the color bars 15 and obtains differential values between the actual ink densities and target ink densities at the gray patch 14. Then, both the amount of the primary-color-component and that of the color-impurity-component at the solid patches 11, 12, and 13 are respectively substituted into equations at every detection of the differential values and that of the gray patches. In this way, ink supply volume is adjusted as a result of converting the differential values into primary-color-component differential amount in each of the color-inks.

10 Claims, 13 Drawing Sheets

INK SUPPLY CONTROL DEVICE FOR PRINTING MACHINES AND A METHOD THEREFOR

BACKGROUND OF THE INVENTION

1. Field of the Invention

The present invention relates to an ink supply control device for printing machines and a method for controlling ink supply, specifically to an adjustment of ink volume under consideration of color impurities contained in each of the color inks.

2. Description of the Prior Art

Generally, color-printed-matters are printed with four-color inks such as cyan (C), magenta (M), yellow (Y) and black (K). FIG. 11 is a brief side view illustrating the overall structure of an offset press.

Printing plates for black, for cyan, for magenta, and for yellow are respectively disposed on each of plate cylinders 45 installed in a first-printing-unit 41, a second-printing-unit 42, a third-printing-unit 43, and a fourth-printing-unit 44.

Color printing is carried out on printing papers fed from the feeder 40 and passing through each of the printing units with the four-color inks by superimposing each of the color-inks. Each of the color-inks is printed on the printing paper as a plurality of fine dots. A variety of colors can be expressed by accurately adjusting the dot area ratios of each of the color-inks.

Inking units 55 for supplying ink to the printing plates disposed on the plate cylinders 45 are provided respectively to the first-printing-unit 41, the second-printing-unit 42, the third-printing-unit 43, and the fourth-printing-unit 44. FIG. 12 is a side view illustrating the overall structure of the inking unit and vicinity thereof. Ink is stored in an ink fountain 50 consisting of an ink fountain roller 52 and a blade 51.

The ink 10 fed via a gap 51S formed between the blade 51 and the ink fountain roller 52 is supplied to the printing plate disposed on the plate cylinder 45 through an ink roller group 53 including pluralities of ink rollers therein. A volume of the ink supplied to the printing plate can be adjusted by controlling an opening degree of the gap 51S formed between the blade 51 and the ink fountain roller 52 as a result of opening and closing the blade 51.

Dots printed on the printing papers become unexpectedly larger than they should be if a larger volume of ink than the adequate volume is supplied to the plate. This is because a variation of colors can only be expressed by accurately adjusting densities of the dots (an ink volume on the printing paper). As a result, printing accuracy may be decreased if the dots are formed inaccurate in size.

Ink supply volume to each of the printing units needs to be accurately adjusted. It is, however, hard for the operator to calibrate the ink supply volume to an adequate volume through his/her visual observations. In order to solve the problems, a conventional technique is used in which ink densities (ink volume) are measured at solid patches (patches having 100% dot area ratios) each consisting of cyan (C), magenta (M), and yellow (Y) and respectively printed on a printing paper. Ink supply volume is adjusted by controlling opening degrees of the gap 51S of the ink fountain 50 determined according to the densities thus measured.

In the case of adjusting ink volume by measuring the solid patches, the following problems may occur; 1) A phenomenon called "dot gain" in which the size of dots printed on the printing paper is unexpectedly increased due to viscosity of ink and other factors, and 2) Another phenomenon called "trapping" in which superimposition of the color ink is in poor condition because of characteristics of the inks and improper conditions of the printing machine.

By carrying out printing with dots, a slight shift in color may be observed because of "dot gain" and/or "trapping". There is then a high probability of decreasing printing accuracy as well as obtaining undesired colors if ink supply volume is adjusted according to color densities measured at a solid patch. This is because solid patches are patches having 100% dot area ratios, not consisting of dots.

In order to solve the problems, Japanese laid-open publication No. SHO 62-146633 discloses a technique in which ink supply volume is adjusted according to ink densities measured at a gray patch consisting of cyan (C), magenta (M), and yellow (Y) and printed on a printing paper.

With this technique, ink supply volume can be adjusted in a relatively accurate manner because densities of the color inks can be detected in consideration of "dot gain" and/or "trapping" as a result of printing the inks of cyan (C), magenta (M), and yellow (Y) in dots so as to superimpose them on one another.

A certain amount of color component different from the original color component of color ink (color impurity) is contained in each of the color inks as illustrated in FIG. 13A. Color-ink, such as cyan (C) does not consist solely (100%) of the color component of cyan, but also contains other color components such as magenta (M), and yellow (Y).

In FIGS. 13A and 13B, Cc, Cy, and Cm respectively represent color components of cyan, yellow, and magenta contained in cyan ink. Similarly, Mm, My, and Mc respectively represent color components of magenta, yellow, and cyan contained in magenta ink in these figures. Further, Yy, Yc, and Ym respectively represent color components of yellow, cyan, and magenta contained in yellow ink.

As described earlier, a certain amount of color-impurities are contained in each of the color inks as illustrated therein. The ratios of the color-impurities vary depending on the color ink (those color-impurities are exemplarly illustrated in the same ratios in FIGS. 13A and 13B). For instance, if the color-component of cyan on a gray patch is detected, the color density of cyan in the gray patch is measured as a total sum of color density of color-impurities of Mc and Yc each contained respectively in magenta ink and yellow ink in addition to color-component of cyan Cc contained in cyan ink.

Similarly, if the color-component of magenta on the gray patch is detected, the color density of magenta in the gray patch is measured as a total sum of the color density of Ym and Cm in addition to Mm. Further, if the color-component of yellow on the gray patch is detected, the color density of yellow in the gray patch is measured as a total sum of the color density of Cy and My in addition to Yy.

As described earlier, the ink supply volume of cyan ink, magenta ink, and yellow ink can not be adjusted based solely on the color densities of the color-component of cyan, magenta, and yellow detected from the gray patch because the ratios of the color-impurities vary depending on the color of the ink.

In order to solve such a problem, Japanese patent laid-open publication No. SHO58-45527 discloses a method for measuring ink densities and a device using the same in which the following procedures are described. Color densities of solid patches printed with color-inks of cyan, magenta, and yellow being used for actual printing are measured respectively prior to the printing, and then color densities Cc, Cm, Cy, Mm, Mc, My, Yy, Ym, and Yc are stored as predetermined values.

Thereafter, color-densities of an area where color-inks of cyan, magenta, and yellow being superimposed on one another are measured. Then, the color densities of the color-component of cyan, magenta, and yellow at the area (color-densities of each color component shown in FIG. 13B) are measured. Ink supply volumes of the color inks are then respectively adjusted in accordance with values obtained by deducting an ink supply volume representing the predetermined amount of color-impurity (predetermined values) of each of the color inks from the original ink supply volume.

During printing procedures, however, ink on the plate cylinder 45 shown in FIG. 12, which is not yet dried, could undesirably be mixed with an ink different in color stored in the ink fountain 50 as a result of transferring the ink through rollers belonging to the ink roller group 53 in a reverse manner. In that case, the amounts of color-impurities vary with time during the printing procedures.

In the conventional method and the device disclosed, the amounts of the color-impurities are set prior to the printing procedures. In the case of readjusting the ink supply volume during the printing procedures, the ink supply volume is adjusted in accordance with the amount of the color-impurities initially set even when the amounts of the color-impurities at a specific later time vary from the initial values. As a consequence, it is not possible to adjust ink supply volume accurately when performing printing with high accuracy.

SUMMARY OF THE INVENTION

It is an object of the present invention to provide an ink supply control device and a method therefor capable of carrying out accurate printing processes as a result of adjusting the ink supply volume with a high accuracy.

In accordance with characteristics of the present invention, there is provided an ink supply control device for independently adjusting the supply amount of a plurality of basic-color-inks, each of the basic-color-inks including a primary-color-component and a color-impurity-component which is identical with a primary-color-component of another basic-color-ink, the control device comprising:

a target color component amount storing portion for respectively storing a total amount of each color component at a target printed zone as a target color component total amount, the target printed zone being a zone where the basic-color-inks being incorporated are printed under an optimum ratio, an actual color component amount measuring portion for respectively detecting a total amount of each color component as an actual color component total amount as a result of measuring an actual printed zone where the basic-color-inks being incorporated are printed;

an independent color component amount measuring portion for detecting both amounts of primary-color-component and that of color-impurity- component contained in the basic-color-ink at each of independent printed zones where the basic-color-inks are independently printed by respectively measuring the independent printed zones; and a color component amount difference calculating portion for calculating a total differential amount of color components between the target color component total amount and the actual color component total amount;

wherein the independent color component amount measuring portion detects both an amount of the primary-color-component and that of the color-impurity-component contained in the basic-color-ink at each of the independent printed zones when the actual color component amount measuring portion detects an actual color component total amount;

and wherein ink supply amounts of each of the basic-color-inks are respectively adjusted in accordance with the total differential amount of color components, the amounts of primary-color-components and that of color-impurity-components contained therein.

Further, in accordance with characteristics of the present invention, there is provided a method of independently adjusting the supply amount of a plurality of basic-color-inks, each of the basic-color-inks including a primary-color-component and a color-impurity-component which is identical with a primary-color-component of another basic-color-ink, the method comprising the steps of:

storing a total amount of each color component at a target printed zone as a target color component total amount, the target printed zone being a zone where the basic-color-inks being incorporated are printed under an optimum ratio;

detecting a total amount of each color component as an actual color component total amount as a result of measuring an actual printed zone where the basic-color-inks being incorporated are printed;

detecting both an amount of the primary-color-component and that of the color-impurity-component contained in the basic-color-ink at each of the independent printed zones where the basic-color-inks are independently printed by measuring the independent printed zones when the actual color component amount is detected;

calculating a total differential amount of color components between the target color component total amount and the actual color component total amount; and adjusting ink supply amounts of each of the basic-color-inks in accordance with the total differential amount of color components, the amounts of primary-color-components and that of color-impurity-components being contained therein.

While the novel features of the invention are set forth in a general fashion, both as to organization and content. Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
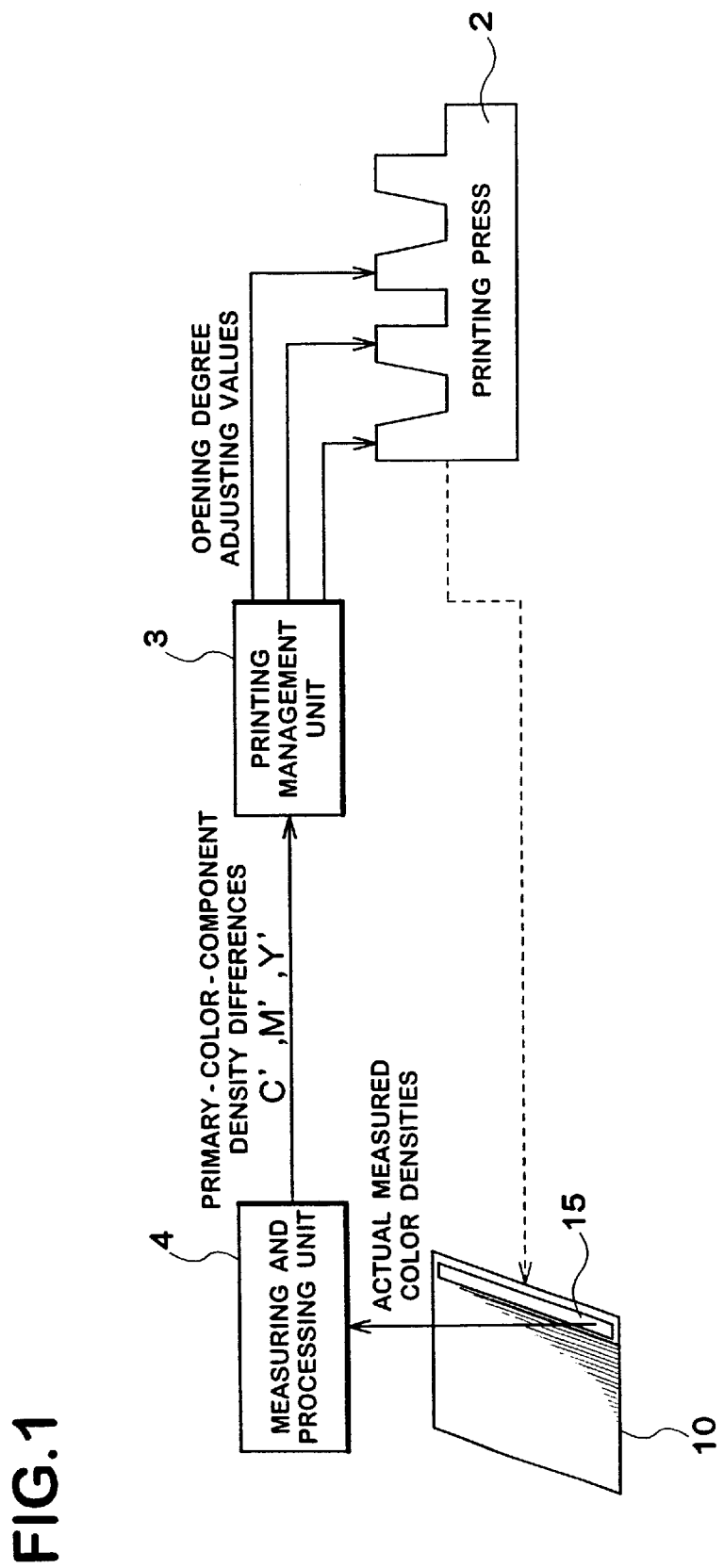
FIG. 1 is a conceptual view illustrating an embodiment of an ink supply control device and a method therefor according to the present invention.
Figure 2:
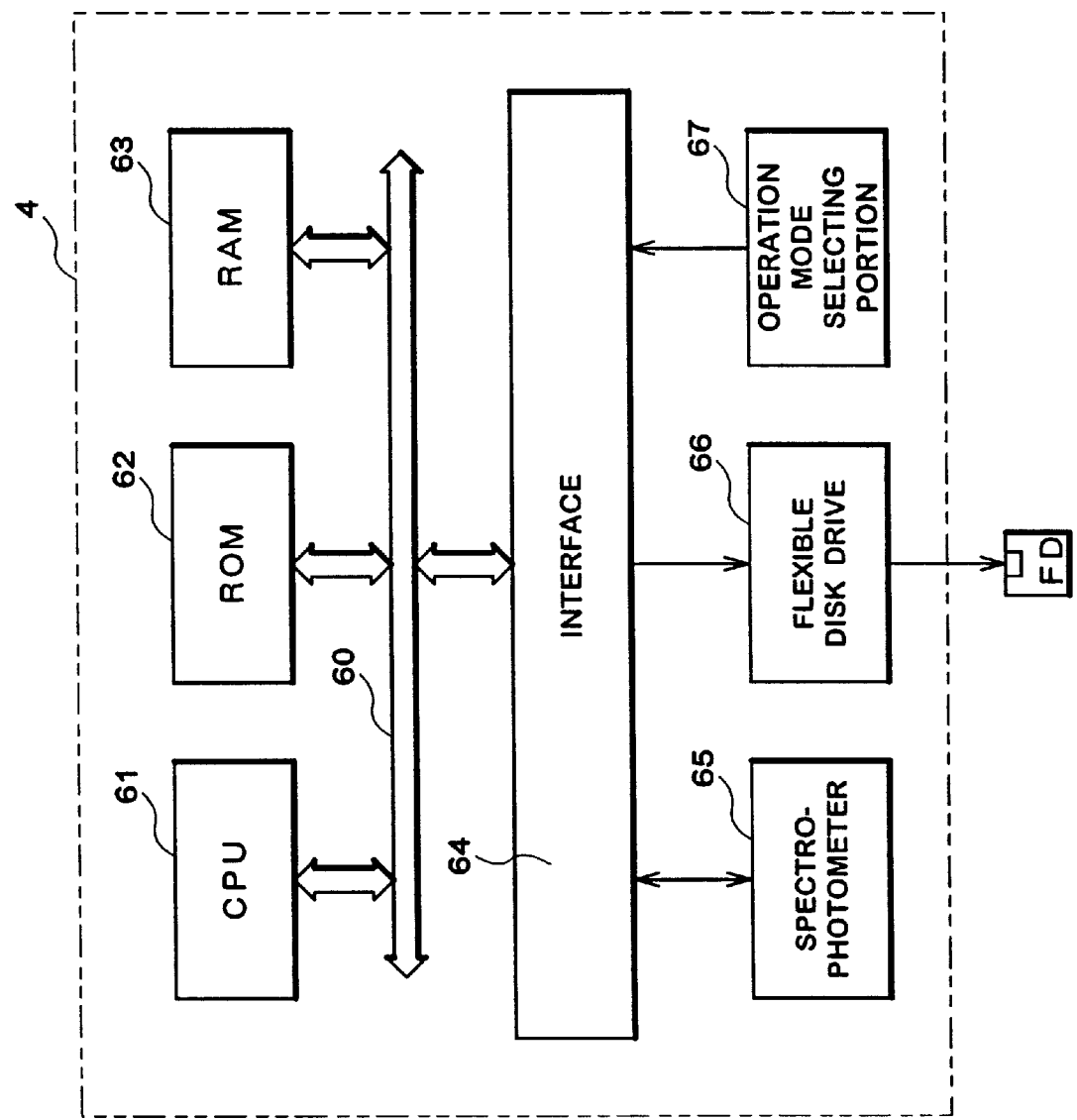
FIG. 2 is a block diagram illustrating a hardware structure of a measurement and processing unit 4 depicted in FIG. 1.
Figure 3:
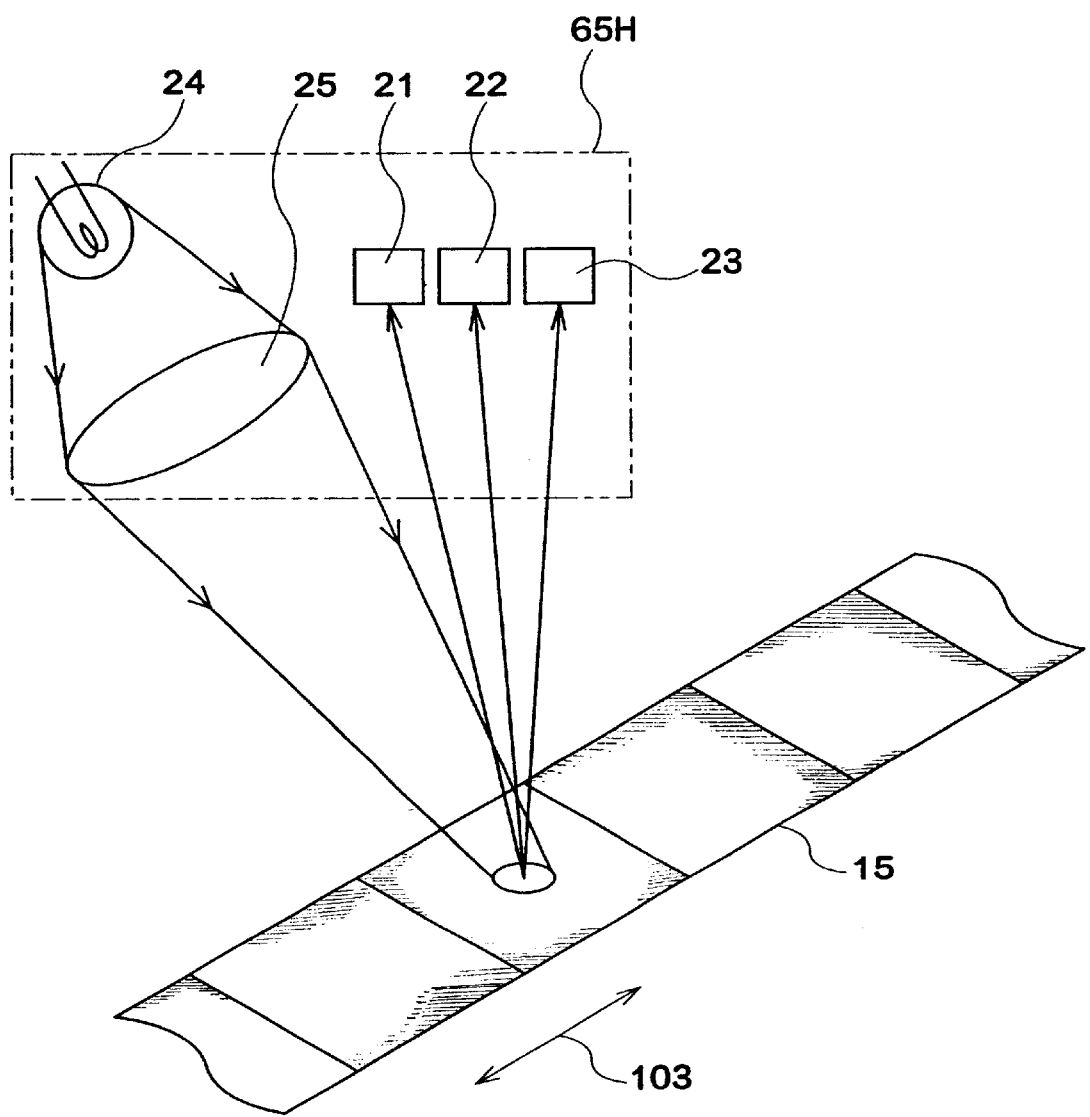
FIG. 3 is a detailed view of a spectrophotometer 65 depicted in FIG. 2.
Figure 4:
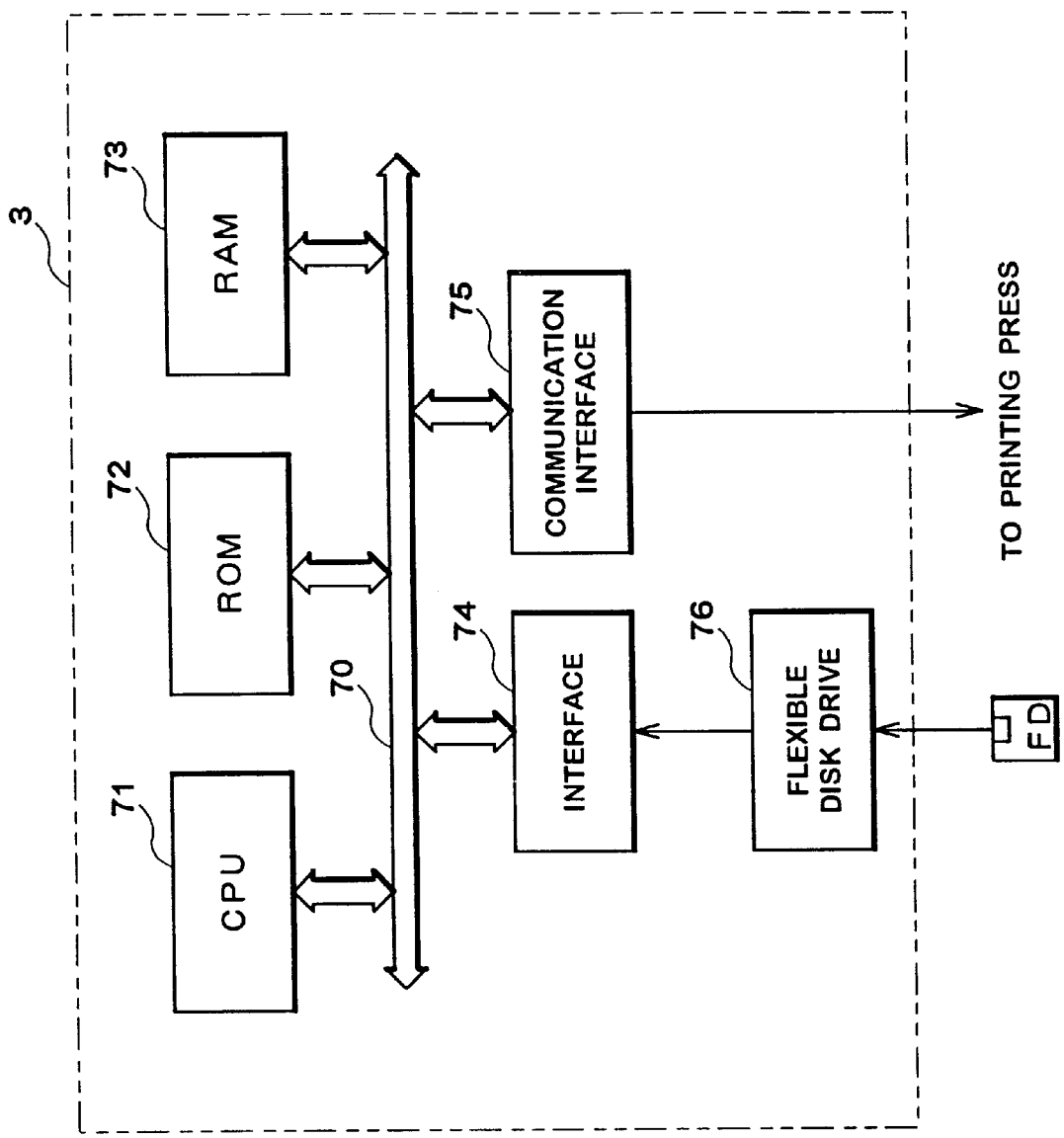
FIG. 4 is a block diagram illustrating a printing management unit 3 depicted in FIG. 1.
Figure 5:
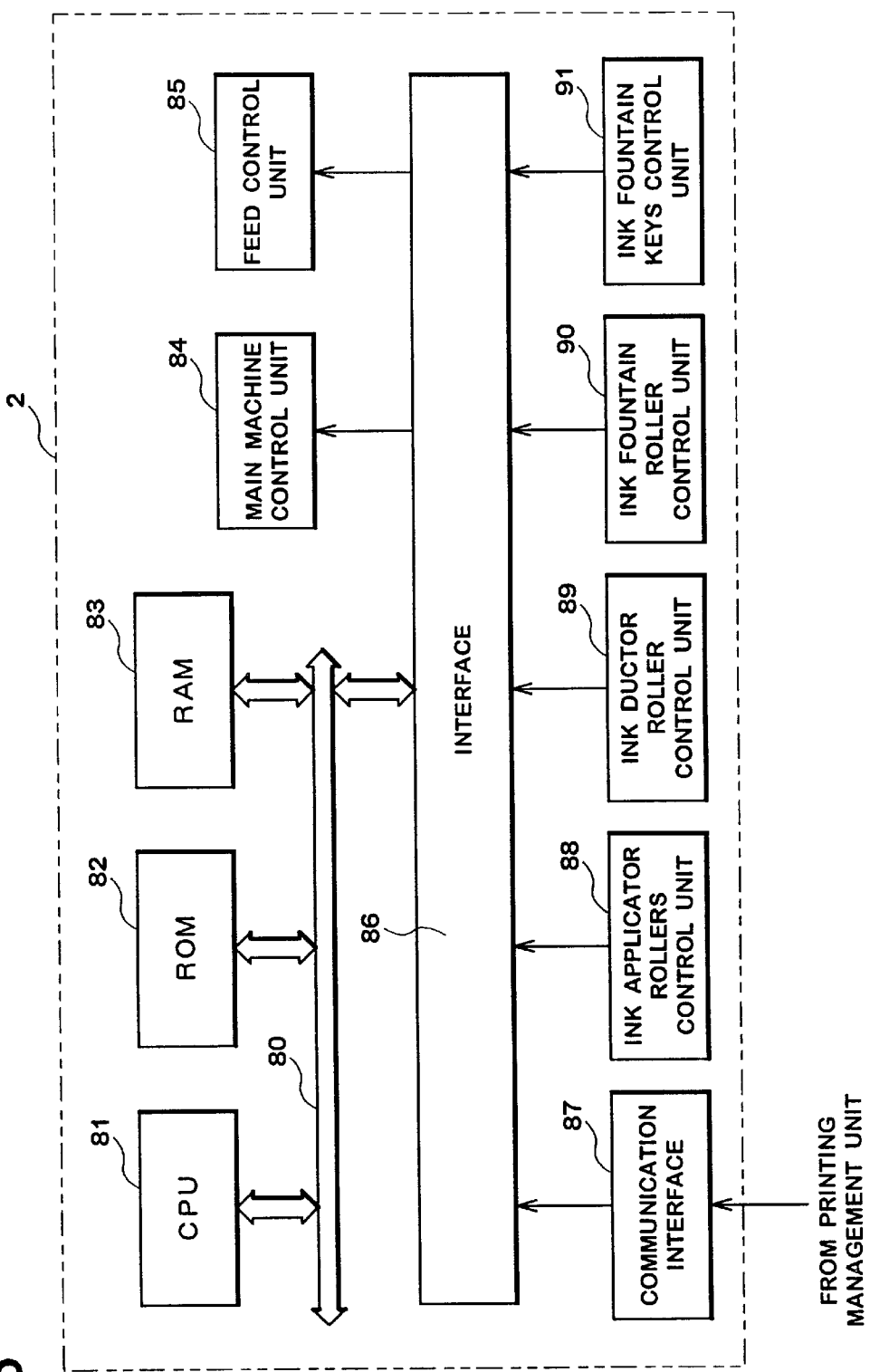
FIG. 5 is a block diagram illustrating a printing press 2 depicted in FIG. 1.

1. An embodiment of an ink supply control device and a method therefor according to the present invention will be described with reference to the accompanying drawings. FIG. 1 is a conceptual view illustrating an ink supply control device and a method therefor in this embodiment. FIG. 2 is a block diagram illustrating a hardware structure of a measurement and processing unit 4 depicted in FIG. 1. FIG. 3 is a detailed view of a spectrophotometer 65 depicted in FIG. 2. Also, FIG. 4 is a block diagram illustrating a printing management unit 3 depicted in FIG. 1, and FIG. 5 is a block diagram illustrating a printing press 2 depicted in FIG. 1.

Figure 6:
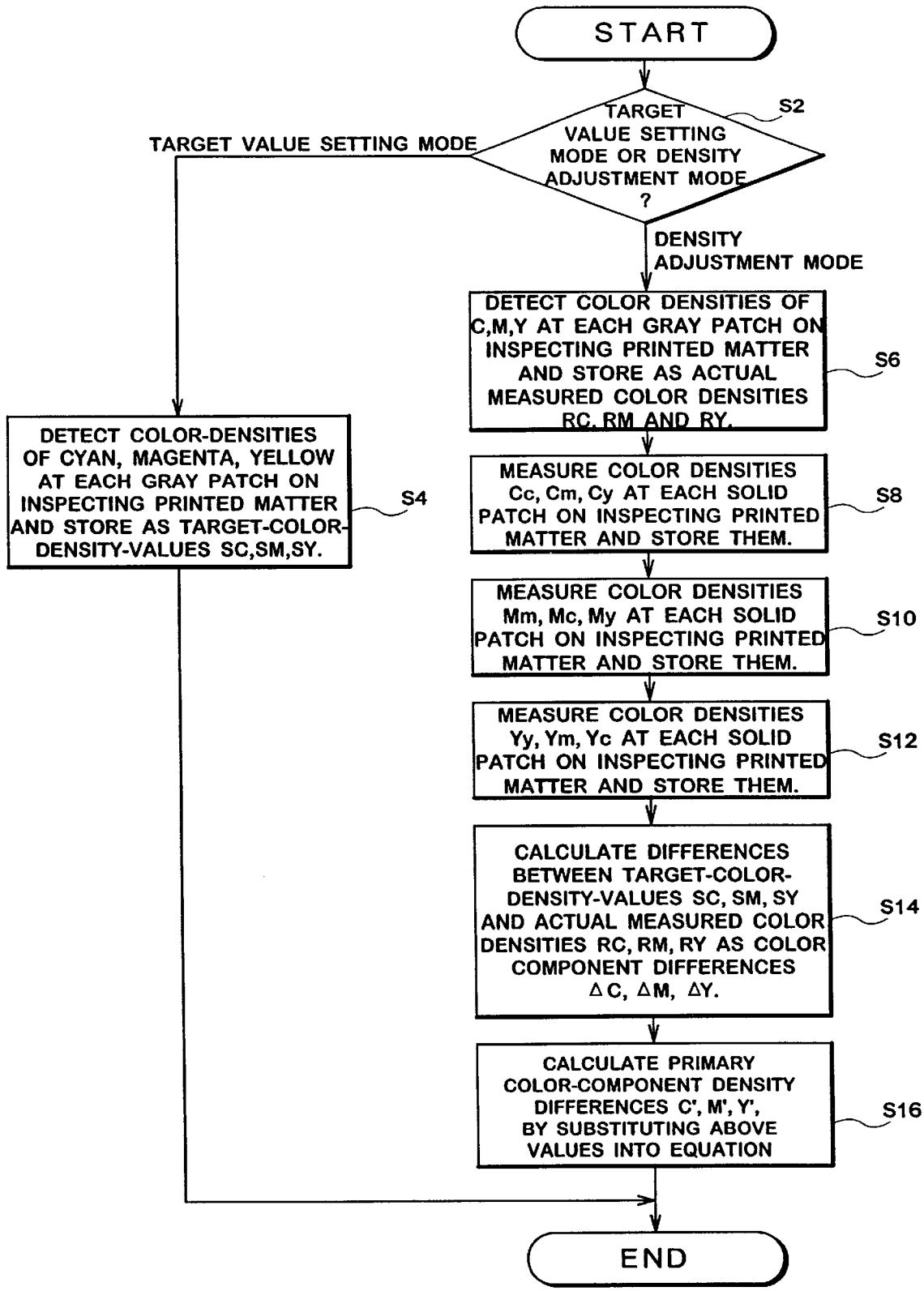
FIG. 6 is a flow chart disclosing a program stored in a ROM 62 of the measurement and processing unit 4 depicted in FIG. 2.
Figure 7:
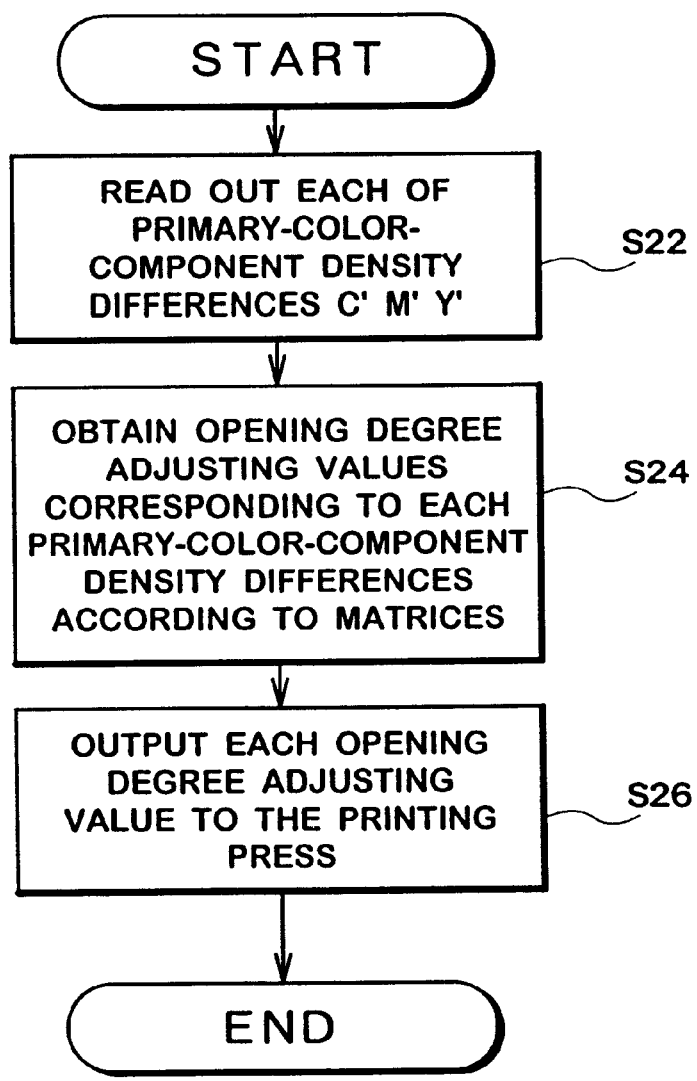
FIG. 7 is a flow chart disclosing a program stored in another ROM 72 of the printing management unit 3 depicted in FIG. 3.
Figure 8A:
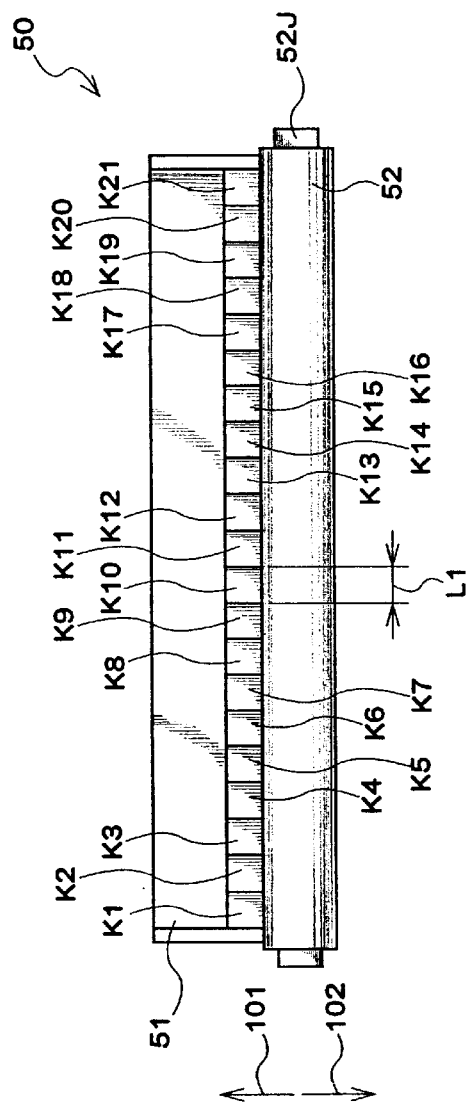
FIG. 8A is a plan view of an ink fountain 50.
Figure 8B:
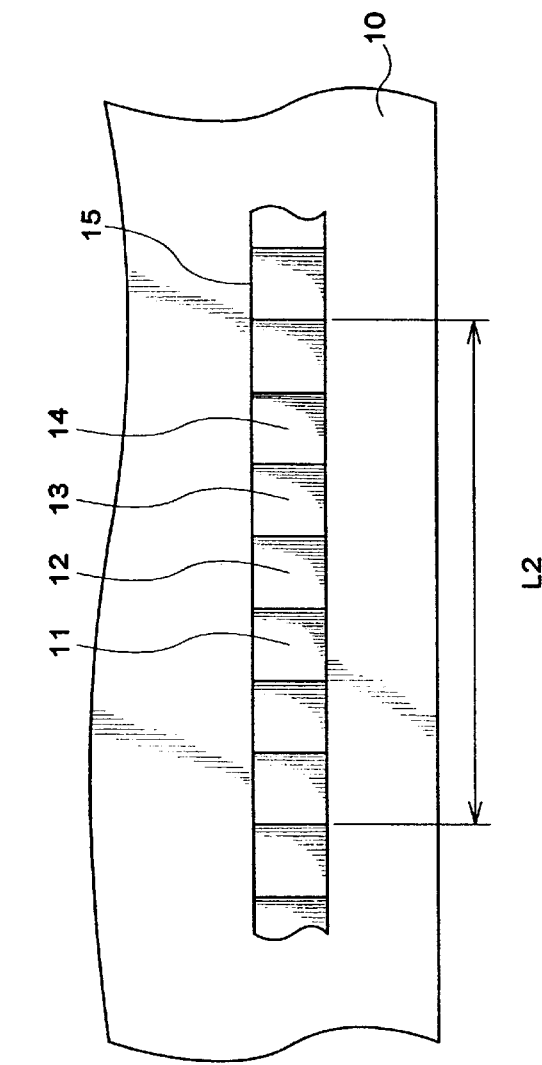
FIG. 8B is an enlarged detailed view of a color bar printed on a printed matter 10.

Further, FIG. 6 is a flow chart disclosing a program stored in a ROM 62 of the measurement and processing unit 4 depicted in FIG. 2, and FIG. 7 is a flow chart disclosing a program stored in another ROM 72 of the printing management unit 3 depicted in FIG. 3. FIG. 8A is a plan view of an ink fountain 50, and FIG. 8B is an enlarged detailed view of a color bar printed on a printed-matter 10.

Figure 9:
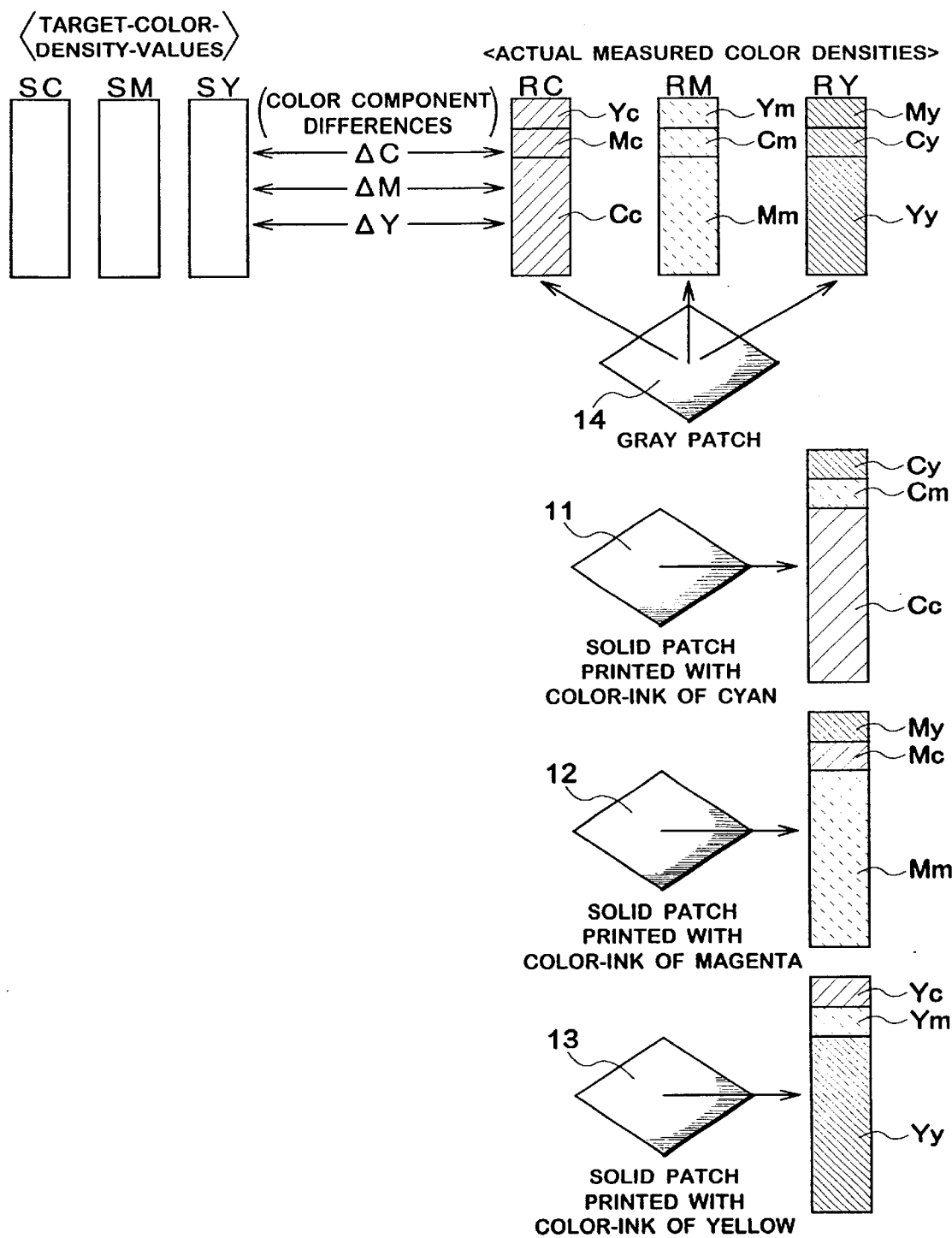
FIG. 9 is a view exemplary illustrating target values of ink densities, and measured values of color-densities at each of patches.
Figure 10:
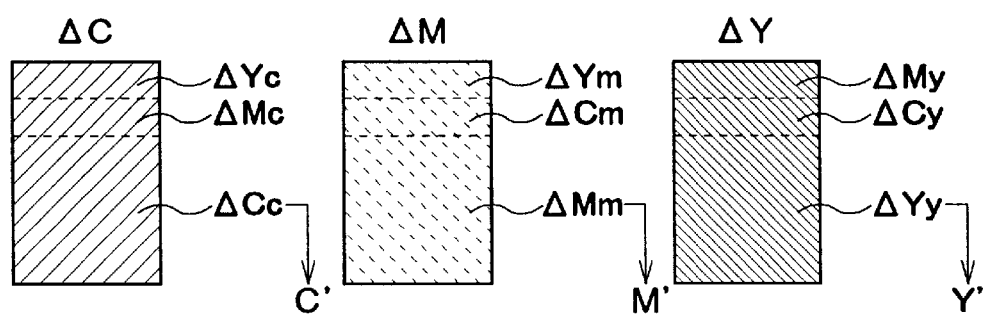
FIG. 10 is a view exemplary illustrating differentials in density depicted in FIG. 9.
Figure 11:
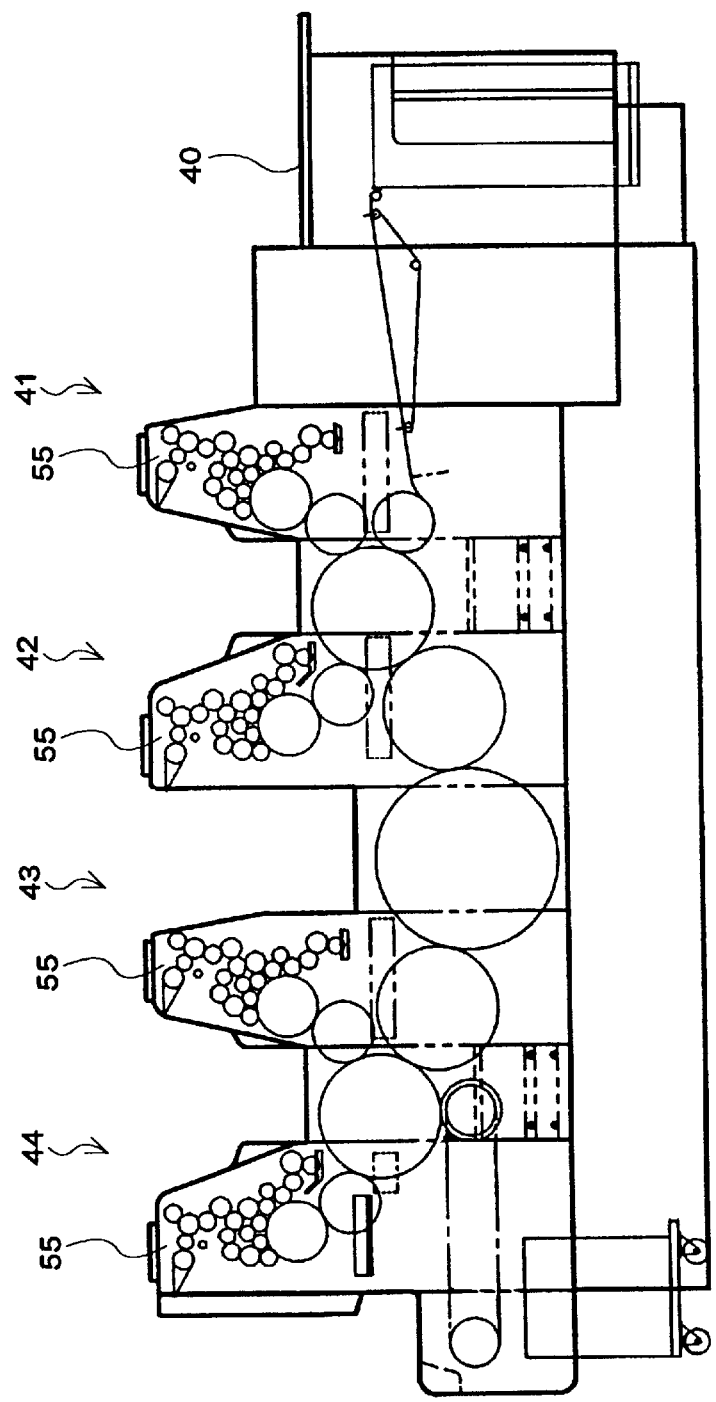
FIG. 11 is a side view schematically illustrating the overall view of an offset press.
Figure 12:
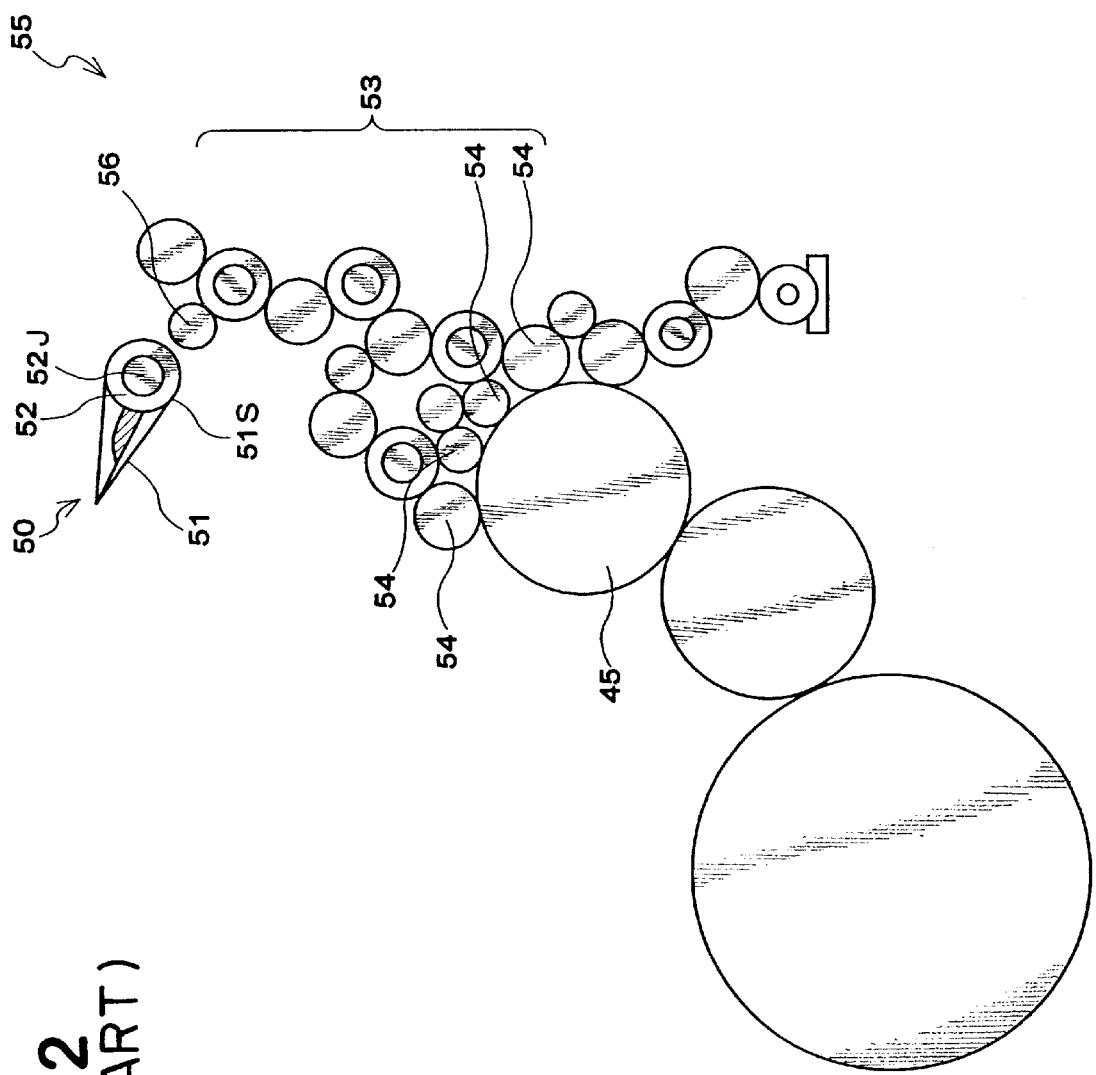
FIG. 12 is a side view illustrating an inking unit 55 depicted in FIG. 11.
Figure 13A:
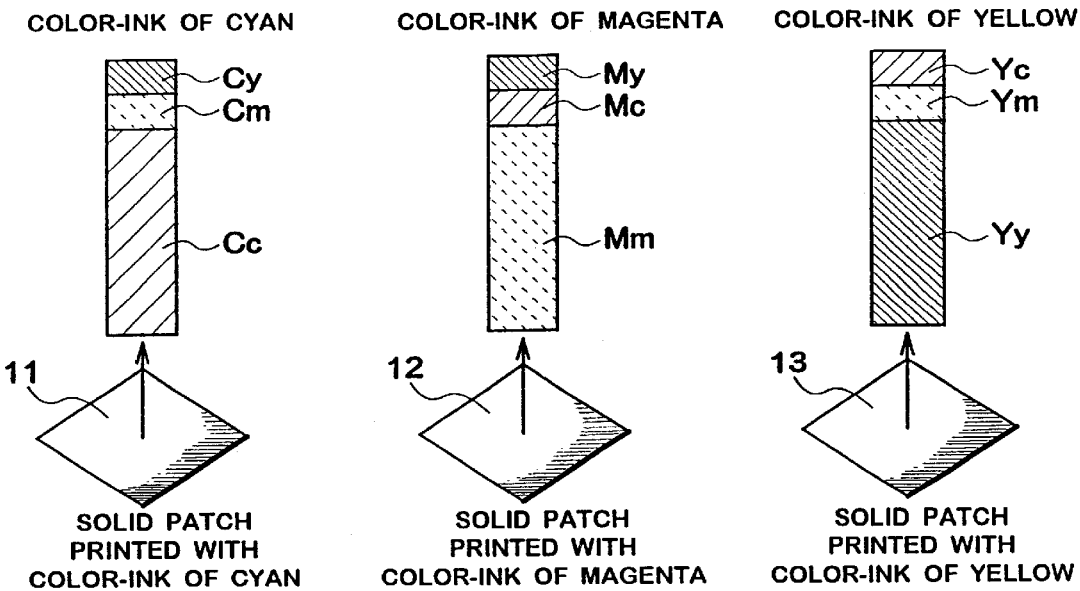
FIG. 13A is a view exemplary illustrating values of ink densities at each of solid patches.
Figure 13B:
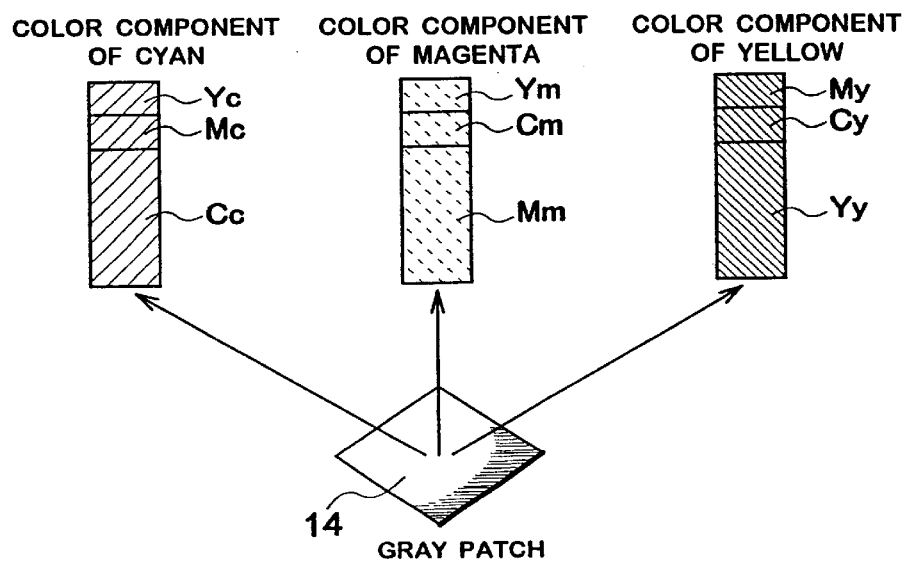
FIG. 13B is another view exemplary illustrating values of ink densities at a gray patch.

Still further, FIG. 9 is a view exemplarly illustrating target values of ink densities, and measured values of color-densities at each of the patches, and FIG. 10 is a view exemplarly illustrating differentials in density depicted in FIG. 9. FIG. 11 is a side view schematically illustrating the overall view of an offset press, and FIG. 12 is a side view illustrating an inking unit 55 depicted in FIG. 11.

2. The Overall Description of the Ink Supply Control System

As shown in FIG. 1, both the printing management unit 3 and the measurement and processing unit 4 are provided to the printing press 2 in the ink supply control system in this embodiment. An offset press depicted in FIG. 11 is used as an example of the printing press 2.

Color printing with four-color inks such as cyan (C), magenta (M), yellow (Y) and black (K) is performed respectively on printing papers fed from a feeder 40 so as to superimpose each of the color-inks. Color-inks of cyan, magenta, and yellow form basic-color-inks.

Each of the color-inks is printed on the printing paper as a plurality of fine dots. A variety of colors can be expressed by accurately adjusting dot area ratios of each of the inks. Inking units 55 for supplying inks to the printing plates 45 are installed respectively in each of the printing units.

FIG. 12 is a side view illustrating the vicinity of an inking unit 55 installed in the second-printing-unit 42 (a printing unit for printing a color-ink of cyan). Description of the first-printing-unit 41 (another printing unit for printing a color-ink of black), the third-printing-unit 43 (another printing unit for printing a color-ink of magenta), the fourth-printing-unit 44 (another printing unit for printing a color-ink of yellow) are omitted because these printing units have similar structure to that of the second-printing-unit 42.

Ink is stored in an ink fountain 50 composed of an ink fountain roller 52 and a blade 51. The ink 10 fed via a gap 51S formed between the blade 51 and the ink fountain roller 52 is transferred on an ink roller group 53 by an ink ductor roller 56.

The ink roller group 53 includes a plurality of ink rollers therein, and the ink thus transferred sequentially on each of the ink rollers is finally supplied to the printing plate disposed on the plate cylinder 45 through ink applicator rollers 54. The blade 51 has opening and closing keys K1, K2, . . . K20, K21 divided into a total of twenty-one (21) along with a direction of an ink roller shaft 52J as depicted in FIG. 8A. Each of the keys is designed so as to be controlled independently in the directions of arrows 101 and 102.

When a gap 51S (FIG. 12) of a specific key is widened as a result of moving the key in a direction of the arrow 101, the ink volume supplied through the gap is increased and dots become larger. On the other hand, ink volume supplied trough the gap is decreased and the dots become smaller when the gap 51S (FIG. 12) is narrowed as a result of moving the key in a direction of the arrow 102.

As depicted in FIG. 1, a color bar 15 is printed on a printed matter 10 together with image(s) printed thereon by the printing press 2. The color bar 15 comprises a series of semi-square shaped patches as shown in FIG. 8B. The color-bar 15 is printed in a direction that is along the direction of the ink roller shaft 52J.

The color bar 15 includes a total of twenty-one (21) sets of patches, each set consisting of seven (7) patches. In other words, the bar code 10 comprises a total of 147 patches such as seven (7) patches/set times twenty-one (21) sets. A width L2 of each patch is the same as that of a width L1 of the key depicted in FIG. 8A.

A solid-patch 11 (a patch having 100% dot area ratios in cyan (C)), another solid-patch 12 (a patch having 100% dot area ratios in magenta (M)), and another solid-patch 13 (a patch having 100% dot area ratios in yellow (Y)) are included in the seven (7) patches forming each set as depicted in FIG. 8B.

In addition to these patches, a gray patch 14 on which well-balanced dots printed with color-inks of cyan, magenta, and yellow, is included in the set. In the gray patch 14, ideal gray may be reproduced, for example, by color-inks incorporated in dot ratios of 70% cyan ink, 60% magenta ink, and 60% yellow ink in a superimposed manner.

As shown in FIG. 1, actual ink densities (ink volume) at each of the patches in the color bars 15 printed with the printing press 2 are measured with a measuring and processing unit 4. Then, differential values between the actual ink densities of each color-ink at the gray patch 14 and target ink densities which are measured and stored previously are calculated with respect to the actual ink densities. Thereafter, the differential values are converted into a primary-color-component differential amount for each of the basic-color-inks as a result of carrying out a calculation according to a predetermined equation. The primary-color-component differential amount thus converted is provided to the printing management unit 3.

Matrices indicative of relationships between the primary-color-component differential amount and values for adjusting opening degrees of each key are stored in the printing management unit 3. The unit 3 calculates values for adjusting opening degrees of keys by itself according to the primary-color-component differential amount provided from the unit 4. The printing press 2 adjusts opening degrees of the keys in accordance with the values for adjustment provided thereto.

3. Hardware Structures of Both the Printing Management Unit 3 and the Measuring and Processing Unit 4.

Subsequently, hardware structure of the measuring and processing unit 4 will be described with reference to FIG. 2. A CPU 61, a ROM 62, and a RAM 63 are connected to a bus-line 60. The CPU 61 controls all the related parts in accordance with the program stored in the ROM 62. A spectrophotometer 65, a flexible disk drive 66, and an operation-mode-selecting portion 67 are also coupled to the bus-line 60. The operator selects either a target value setting mode or a density adjustment mode and then inputs the selected mode through the operation-mode-selecting portion 67.

The spectrophotometer 65 has a head 65H as shown in FIG. 3, and optical sensors, such as a sensor 21 for red, a sensor 22 for green, and a sensor 23 for blue. A lamp 24, and a collimator lens 25 are provided on the head 65H. Light emitted from the lamp 24 is collimated with the collimator lens 25 and then is radiated to a patch of the color bar 15.

The light reflected by the patch is inputted to the sensors 21, 22, and 23. Color-components of red, green, and blue are respectively measured as digital signals in accordance with wavelength of the reflected light. Color-densities of the color-component of cyan, magenta, and yellow at the patch are detected based on the measured values. The head 65H is scanned in a direction of an arrow 103, that is the same direction as the alignment of the patches in the color-bar 15, and measures color-densities of color-components at each of the patches.

Subsequently, hardware structure of the printing management unit 3 will be described with reference to FIG. 4. A CPU 71, a ROM 72, and a RAM 73 are connected to a bus-line 70. The CPU 71 controls all the related parts in accordance with the program stored in the ROM 72. A flexible disk drive 76 is also coupled to the bus-line 70 via an interface 74. Signals to the printing press 2 are transmitted through a communication interface 75 in an on-line basis.

Further, hardware structure of the second-printing-unit 42 of the printing press 2 will be described with reference to FIG. 5. Description of hardware structure of the first-printing-unit 41, the third-printing-unit 43, and the fourth-printing-unit 44 is omitted because these printing units have similar structure to that of the second-printing-unit 42.

A CPU 81, a ROM 82, and a RAM 83 are connected to a bus-line 80. The CPU 81 controls all the related parts in accordance with the program stored in the ROM 82. A main machine control unit 84 and a feed control unit 85 are coupled to the bus-line 80 via an interface 86. The main machine control unit 84 controls the rotation of the plate cylinders and other cylinders mounted in each of the printing units and that of the ink rollers. The feed control unit 85 controls feeding operations carried out with the feeder 40 shown in FIG. 11.

Further, a communication interface 87, an ink applicator rollers control unit 88, an ink ductor roller control unit 89, an ink fountain roller control unit 90, and an ink fountain keys control unit 91 are coupled to the bus-line 80 via an interface 86.

Signals transmitted by the printing management unit 3 are inputted therein through the communication interface 87. The ink applicator rollers control unit 88 controls either attachment or detachment of the ink applicator rollers 54 of the ink roller group 53 to the plate cylinder 45 (see FIG. 12). The ink ductor roller control unit 89 controls the reciprocal movement of the ink ductor roller 56 such as suspension of its movement, and the ink fountain roller control unit 90 controls the rotating amount of the ink fountain roller 52. The ink fountain keys control unit 89 independently control the movement of the keys K1, K2 . . . K20, K21 in the directions of arrows 101 and 102.

4. Procedures of Adjusting Ink Supply Volume

Continuously, procedures of adjusting ink supply volume will be described hereunder with reference to flow charts depicted in FIGS. 6 and 7. In order to set target-color-density-values which are used as reference values for adjusting ink supply volumes, the operator sets a reference printed matter to the measuring and processing unit 4. The reference printed matter is a printed matter provided from the user and printed with ideal colors. A color-bar 15 (FIGS. 1 and 8B) is also printed on the reference printed matter.

The operator, then, selects the target value setting mode so as to start operation of the unit 4 as a result of operating the operation-mode-selecting portion 67 (FIG. 2). FIG. 6 is a flow chart disclosing a program stored in the ROM 62. The CPU 61 installed in the unit 4 proceeds its process to step S4 from step S2 when the selection of the operation-mode-selecting portion 67 into the target value setting mode is recognized through the interface 64.

At step S4, color-densities of color-component of cyan, magenta, and yellow at gray patches 14 in the color-bar 15 printed on the reference printed matter are detected as a result of measuring the gray patches 14 in the color-bar 15 printed on the reference printed matter (see FIG. 3). These color densities are stored in the RAM 63 as target-color-density-values SC, SM, and SY (see FIG. 9).

As described earlier, the color-bar 15 includes a total of twenty-one (21) sets of patches, each corresponding to the opening and closing keys divided into a total of twenty-one (21) in this embodiment. The gray patches 14 are respectively included in each of the sets. The target-color-density-values SC, SM, and SY are measured respectively at each of twenty-one (21) gray patches and stored therein.

The gray patches 14 on the reference printed matter and the target-color-density-values SC, SM, and SY respectively form a target printed zone and a target color component total amount in this embodiment. Also, the AM 63 storing the target-color-density-values SC, SM, and SY forms a target color component amount storing portion in this embodiment.

For an example discussed further below, it is assumed that the target-color-density-values SC, SM, and SY at a gray patch 14 corresponding to the key K1 (FIG. 8A) are measured respectively as "0.97", "0.96", and "0.98". Similarly, the target-color-density-values S C, SM, and SY of the patches corresponding to the keys K2 through K21 are measured.

A printing paper so called "OK-sheet" which is considered as the best one out of printed matters printed with the printing press 2 during a test print, may also be used instead of the reference printed matter. Alternatively, in the case of carrying out printing with the target-color-density-values SC, SM, and SY measured at the previous printing, these measured values may be used. Thus, the target-color-density-values SC, SM, and SY are preset.

Thereafter, printing with the printing press 2 is carried out for a while, and the operator sets one of the printed matters which is to be inspected (hereinafter referred to as inspected printed matter) with respect to the unit 4 in order to adjust ink supply volume. The adjustment, for example, is carried out at every 100 prints out of 1,000 sheets to be printed.

After setting the inspected printed matter with respect to the unit 4, the operator selects the density adjustment mode so as to start measurement of the unit 4 as a result of operating the operation-mode-selecting portion 67 (FIG. 2). The CPU 61 installed in the unit 4 proceeds with its process to step S6 from step S2 when the conversion of the operation-mode-selecting portion 67 to the density adjustment mode is recognized through the interface 64.

At step S6, color-densities of color-component of cyan, magenta, and yellow at each of the gray patches 14 (a total of the twenty-one (21) gray patches 14) printed on the inspected printed matter are detected. These color densities thus measured are stored in the RAM 63 as actual measured color densities RC, RM, and RY (see FIG. 9). The gray patches 14 on the reference printed matter and the actual measured color densities RC, RM, and RY respectively form actual printed zones and actual color component total amount in this embodiment.

For the example discussed further below, it is assumed that the actual measured color densities RC, RM, and RY at a gray patch 14 corresponding to the key K1 (FIG. 8A) are measured respectively as "0.93", "0.92", and "0.96". Similarly, the actual measured color densities RC, RM, and RY of the patches corresponding to the keys K2 through K21 are measured.

A certain amount of color component different from the original color component of color ink (color impurity) is contained in each of the color inks, and the ratios of the color-impurities vary depending on the color ink (those color-impurities are exemplarily illustrated all to have the same ratios in FIG. 9).

According to this principle, the actual measured color density RC, for example, "0.93" detected color-component of cyan ink at the gray patches 14 where color-inks of cyan, magenta, and yellow are superimposed on one another is measured as a total sum of color density of color-impurities of Mc and Yc each contained respectively in magenta ink and yellow ink in addition to the color-component of cyan Cc contained in cyan ink.

Similarly, the actual measured color density RM, for example, "0.92" detected color-component of magenta ink is detected as a total sum of color density of color-impurities of Ym and Cm in addition to color-component of magenta Mm, and the actual measured color density RY, for example, "0.96" detected color-component of yellow ink is detected as a total sum of color density of color-impurities of Cy and My in addition to the color-component of magenta Yy. In this embodiment, the color-components Cc, Mm, and Yy form primary-color-components, and color components Cm, Cy, Mc, My, Yc, and Ym form color-impurity-components.

Upon detecting and storing the actual measured color densities of RC, RM, and RY at each of the gray patches 14 at step S6, the process proceeds to step S8 in which color densities Cc, Cm, and Cy (see FIG. 9) at each of the solid patches 11 printed with the color-ink of cyan on the inspected printed matter are measured and stored. As described earlier, a total of twenty-one (21) solid patches 11 printed with the color-inks of cyan are formed in the color bar 15 corresponding to the keys of the ink fountain 50 in this embodiment.

At step S8, color densities Cc, Cm, and Cy at each of the twenty-one (21) solid patches 11 printed with the color-ink of cyan are respectively measured. For the example discussed further below, it is assumed that the color densities Cc, Cm, and Cy at the solid patches 11 printed with the color-ink of cyan corresponding to the key K1 (FIG. 8A) are measured respectively as "1.58", "0.47", and "0.20".

Subsequently, the process proceeds to step S10 in which color densities of Mc, Mm, and My (see FIG. 9) at each of the solid patches 12 printed with the color-ink of magenta on the inspected printed matter are measured and stored. In this embodiment, a total of twenty-one (21) solid patches 12 printed with the color-ink of magenta are formed in the color-bar 15 corresponding to the keys of the ink fountain 50 as well.

At step S10, color densities Mc, Mm, and My at each of the twenty-one (21) solid patches 12 printed with the color-ink of magenta are respectively measured. For the example discussed further below, it is assumed that the color densities Mc, Mm, and My at the solid patches 12 printed with color-ink of magenta corresponding to the key K1 (FIG. 8A) are measured respectively as "0.30", "1.51", and "0.77".

Similarly, the process proceeds to step S12 in which color densities of Yc, Ym, and Yy (see FIG. 9) at each of the solid patches 13 printed with the color-ink of yellow on the inspected printed matter are measured and stored. In this embodiment, a total of twenty-one (21) solid patches 13 printed with the color-ink of yellow are formed in the color-bar 15 corresponding to the keys of the ink fountain 50 as well.

At step S12, color densities Yc, Ym, and Yy at each of the twenty-one (21) solid patches 13 printed with the color-ink of yellow are respectively measured. For the example discussed further below, it is assumed that the color densities Yc, Ym, and Yy at the solid patches 13 printed with the color-ink of yellow corresponding to the key K1 (FIG. 8A) are measured respectively as "0.10", "0.14", and "1.04".

As described earlier, at steps S8, S10, and S12, color densities of Cc, Cm, Cy, Mc, Mm, My, Yc, Ym, and Yy at each of the solid patches 11, 12, and 13, each printed with the color-ink of cyan, yellow, and magenta are always measured when the actual measured color densities RC, RM, and RY at each of the gray patches 14 on the inspected printed matter are measured at step S6.

The solid patches 11, 12, and 13, each printed with the color-ink of cyan, yellow, and magenta form independent printed zones in this embodiment, the spectrophotometer 65 forms both an actual color component amount measuring portion and an independent color component amount measuring portion in this embodiment.

Upon measuring the above color densities, the process proceeds to step S14 in which differences between the target-color-density-values SC, SM, and SY stored at step S4 and the actual measured color densities RC, RM, and RY stored at step S6 are calculated as color component differences $\Delta C$, $\Delta M$, and $\Delta Y$. The color component differences $\Delta C$, $\Delta M$, and $\Delta Y$ form a total differential amount of color components in this embodiment. The CPU 61 calculating the differences $\Delta C$, $\Delta M$, and $\Delta Y$ forms a color component amount difference calculating portion in this embodiment.

For the example discussed further below and according to the above assumptions, the color component differences $\Delta C$, $\Delta M$, and $\Delta Y$ corresponding to the key K1 (FIG. 8A) are respectively "0.04", "0.04", and "0.02". Similarly, the color component differences $\Delta C$, $\Delta M$, and $\Delta Y$ corresponding to the keys K2 through K21 are measured accordingly.

As shown in FIG. 10, the color component difference $\Delta C$ may be considered as a total sum of a differential value in density $\Delta Cc$ corresponding to the primary-color-component, and other differential values in density $\Delta Mc$, and $\Delta Yc$ each corresponding to color-impurity-components. Similarly, the color component differences ΔM and ΔY may also be considered respectively as a total sum of a differential value in density ΔMm corresponding to the primary-color-component, and other differential values in density ΔCm and ΔYm each corresponding to the color-impurity-component, and another total sum of a differential value in density ΔYy corresponding to the primary-color-component and other differential values in density ΔCy, and ΔMy each corresponding to color-impurity-components.

The CPU 61 proceeds its process from step S14 to step S16 in which the differential values in density ΔCc, ΔMm, and ΔYy, are calculated using Equation 1. The differential values ΔCc, ΔMm, and ΔYy, are thus calculated respectively corresponding to primary-color-component density differences C', M', and Y'. The primary-color-component density difference C', M', and Y' form primary-color-component differential amounts in this embodiment.

Equation 1 shown below is previously stored in ROM 62 (FIG. 2). The principle used for the Equation 1 will be described later.

$$\begin{bmatrix} C' \\ M' \\ Y' \end{bmatrix} = \begin{bmatrix} Cc/Cc & Mc/Mm & Yc/Yy \\ Cm/Cc & Mm/Mm & Ym-Yy \\ Cy/Cc & My/Mm & Yy/Yy \end{bmatrix}^{-1} \begin{bmatrix} \Delta C \\ \Delta M \\ \Delta Y \end{bmatrix} \quad \text{EQUATION 1}$$

wherein Cc=1.58, Cc is the color density of color-component of cyan contained in cyan ink, wherein Cm=0.47, Cm is the color density of color-component of magenta contained in cyan ink, wherein Cy=0.20, Cy is the color density of color-component of yellow contained in cyan ink, wherein Mc 0.30, Mc is the color density of color-component of cyan contained in magenta ink, wherein Mm=1.51, Mm is the color density of color-component of magenta contained in magenta ink, wherein My=0.77, My is the color density of color-component of yellow contained in magenta ink, wherein Yc=0.10, Yc is the color density of color-component of cyan contained in yellow ink, wherein Ym=0.14, Mm is the color density of color-component of magenta contained in yellow ink, wherein Yy=1.04, Yy is the color density of color-component of yellow contained in yellow ink, wherein ΔC=0.04, ΔC is the color component difference between the target-color-density-value SC and the actual measured color density RC, wherein ΔM=0.04, ΔM is the color component difference between the target-color-density-value SM and the actual measured color density RM, and wherein ΔY=0.02, ΔY is the color component difference between the target-color-density-value SY and the actual measured color density RY.

Using the exemplary values identified above, equation 2 is obtained as a result of substituting each of the above values into the equation 1.

$$\begin{bmatrix} C' \\ M' \\ Y' \end{bmatrix} = \begin{bmatrix} 1.58/1.58 & 0.30/1.51 & 0.10/1.04 \\ 0.47/1.58 & 1.51/1.51 & 0.14/1.04 \\ 0.20/1.58 & 0.77/1.51 & 1.04/1.04 \end{bmatrix}^{-1} \begin{bmatrix} 0.2 \\ 0.4 \\ 0.4 \end{bmatrix} \quad \text{EQUATION 2}$$

-continued $$= \begin{bmatrix} 1 & 0.199 & 0.096 \\ 0.297 & 1 & 0.135 \\ 0.127 & 0.510 & 1 \end{bmatrix}^{-1} \begin{bmatrix} 0.02 \\ 0.04 \\ 0.04 \end{bmatrix}$$

$$= \begin{bmatrix} 1.061 & -0.171 & -0.079 \\ -0.319 & 1.125 & -0.121 \\ 0.028 & -0.552 & 1.072 \end{bmatrix} \begin{bmatrix} 0.02 \\ 0.04 \\ 0.04 \end{bmatrix}$$

$$= \begin{bmatrix} 0.011 \\ 0.034 \\ 0.021 \end{bmatrix}$$

Thus, for this example, the primary-color-component density differences C', M', and Y' corresponding to the key K1 (FIG. 8A) such as C'=0.011, M'=0.034, and Y'=0.021, are obtained.

As shown in FIG. 10, the primary-color-component density differences C', M', and Y' respectively correspond to the differential value in density ΔCc within the color component differences ΔC, the differential value in density ΔMm within the color component differences ΔM, and the differential value in density ΔYy within the color component differences ΔY.

Similarly, primary-color-component density differences C', M', and Y' at patches each corresponding to the keys K2 through K21 (FIG. 8A) are obtained. The primary-color-component density differences C', M', and Y' thus obtained are stored in a flexible disk through the flexible disk drive 66. The flexible disk is then inserted into the flexible disk drive 76 installed in the printing management unit 3 depicted in FIG.4.

Subsequently, operations of the printing management unit 3 will be described with reference to FIG. 7. The CPU 71 provided in the unit 3 reads out each of the primary-color-component density differences C', M', and Y' stored in the flexible disk through the disk drive 76 (step S22).

Although, each of the primary-color-component density differences C', M', and Y' are retrieved into the unit 3 using the flexible disk in this embodiment, the density differences C', M', and Y' may also be retrieved via an on-line connection.

Within the ROM 72 in the unit 3, matrices of each color for converting the primary-color-component density differences into opening degrees of the keys are stored, the matrices being obtained on a learn-by-experience basis. Opening degree adjustment values corresponding to the primary-color-component density differences are obtained in accordance with the matrices. The opening degree adjustment values and the ROM 72 storing the matrices respectively form a corresponding relations storing portion and an ink adjustment value in this embodiment.

Opening degree adjustment values corresponding to each of the primary-color-component density differences read out at step S22 are obtained in accordance with the matrices (step S24). As described earlier, a total of twenty-one (21) of the primary-color-component density differences C', M', and Y' respectively corresponding to the keys of the ink fountain 50 are obtained.

With respect to the primary-color-component density differences C', certain opening degree adjustment values are obtained based on the differences C' corresponding to each of the keys K1 through K21 in the second-printing-unit 42 (FIG. 11) by using the matrices (a total of twenty-one (21) of the adjustment values are obtained as well).

Similarly, as to the primary-color-component density differences M', certain opening degree adjustment values are obtained based on the differences M' corresponding to each of the keys K1 through K21 in the third-printing-unit 43 (FIG. 11) by using the matrices.

Moreover, as to the primary-color-component density differences Y', certain opening degree adjustment values are obtained in a similar manner based on the differences Y' corresponding to each of the keys K1 through K21 in the fourth-printing-unit 44 (FIG. 11) by using the matrices.

The CPU 71 obtains each of the opening degree adjustment values and outputs the adjustment values thus obtained to the printing press 2 through the communication interface 75 (see FIG. 4) (step S26). The twenty-one (21) adjustment values obtained based on the density differences C', the density differences M' and the density differences Y' are provided respectively to the second-printing-unit 42 for printing a color ink of cyan, the third-printing-unit 43 for printing a color ink of magenta and the fourth-printing-unit 44 for printing a color ink of yellow.

Upon receiving each of the adjustment values, the CPU 81 in the second-printing-unit 42 adjusts opening degrees of the keys K1 through K21 by providing signals to the ink fountain keys control unit 91. Similarly, adjustment of the opening degrees of the keys in the third-printing-unit 43, and the fourth-printing-unit 44.

As described above, the total amounts of each color component are detected as the actual measured color densities RC, RM, and RY as a result of measuring color densities of the gray patches 14. In this way, each of the color-components including phenomena such as "dot gain" and/or "trapping" caused at the time of incorporating color-inks can be detected, thereby ink supply volume can be adjusted accurately.

By adjusting the ink supply volume in accordance with the primary-color-component density differences C', M', and Y' for each of the basic-color-inks defined under consideration of both the color impurities (Cm, Cy, Mc, My, Yc, and Ym) and the primary-color-components (Cc, Mm, and Yy) contained in each of the basic-color-inks, it is thereby possible to avoid misadjustment in ink supply volume caused by the color-impurity-components contained in each of the basic-color-inks as well as performing much more accurate ink supply control.

Further, ink supply volume can accurately be adjusted with certainty because the primary-color-component density differences C', M', and Y' for each of the basic-color-inks are calculated in accordance with the Equation 1 by using the color component differences ($\Delta C$, $\Delta M$, and $\Delta Y$), the primary-color-components (Cc, Mm, and Yy), and the color impurities (Cm, Cy, Mc, My, Yc, and Ym).

In addition, color densities of Cc, Cm, Cy, Mc, Mm, My, Yc, Ym, and Yy at each of the solid patches 11, 12, and 13, each printed with the color-ink of cyan, yellow, and magenta are always measured when the actual measured color densities RC, RM, and RY at each of the gray patches 14 on the inspected printed matter are measured at step S6 (steps S8, S10, and S12).

Both the amount of the primary-color-component and that of the color-impurity-component can accurately be detected at all times even when the amount of the color-impurities varies according to the time measured during the printing processes. In this way, much more accurate ink supply control can be performed.

Moreover, ink supply amounts of each of the basic-color-inks are respectively adjusted in accordance with opening degree adjusting values obtained based on the primary-color-component density differences C', M', and Y' by using each of the matrices. In this way, ink supply volume can be adjusted more quickly with high accuracy because the ink supply volume is adjusted based on the matrices previously stored.

5. Description of the Equation 1

Subsequently, the principle used to obtain Equation 1 will be described hereunder. The color component differences $\Delta C$, $\Delta M$, and $\Delta Y$ can be expressed respectively by means of the Equations 4-1, 4-2, and 4-3 below (see FIG. 10). Target values and the actual measured values Cm/Cc, Cy/Cc, Mc/Mm, My/Mm, Yc/Yy, Ym/Yy are assumed as equal to one another in the equations expressed below.

$$\Delta C = \Delta Cc + \Delta Mc + \Delta Yc \quad \text{EQUATION 4-1}$$
$$= \Delta Cc(Cc/Cc) + \Delta Mm(Cm/Mm) + \Delta Yy(Yc/Yy)$$

$$\Delta M = \Delta Mm + \Delta Cm + \Delta Ym \quad \text{EQUATION 4-2}$$
$$= \Delta Mm(Mm/Mm) + \Delta Cc(Cm/Cc) + \Delta Yy(Ym/Yy)$$

$$\Delta Y = \Delta Yy + \Delta Cy + \Delta My \quad \text{EQUATION 4-3}$$
$$= \Delta Yy(Yy/Yy) + \Delta Cc(Cy/Cc) + \Delta Mm(My/Mm)$$

Equation 3 below is obtained from Equations 4-1, 4-2, and 4-3, and Equation 1 is therefore obtained now written as Equation 3.

$$\begin{bmatrix} \Delta C \\ \Delta M \\ \Delta Y \end{bmatrix} = \begin{bmatrix} Cc/Cc & Mc/Mm & Yc/Yy \\ Cm/Cc & Mm/Mm & Ym/Yy \\ Cy/Cc & My/Mm & Yy/Yy \end{bmatrix} \begin{bmatrix} C' \\ M' \\ Y' \end{bmatrix} \quad \text{EQUATION 3}$$

6. Other Embodiments

The ink supply control device and the method therefor according to the present invention is not limited to the embodiments described earlier. The ink supply control system, in which both the printing management unit 3 and the measurement and processing unit 4 are provided separately relative to the printing press 2, is described in the above described embodiments. Both the printing management unit 3 and the measurement and processing unit 4, however, may be installed in the printing press 2.

In the embodiments described above, blade 51 has the opening and closing keys divided into a total of twenty-one (21), the keys, however, may either be divided in equal or less than twenty (20) or equal or more than twenty-two (22). Moreover, a blade capable of adjusting ink supply volume by moving and closing entirely in a unitized manner and not having divided keys can also be applied to the present invention. Further, the present invention is applied to the adjustment of ink supply volume for three (3) color-inks such as cyan, magenta, and yellow; the present invention can be applied, however, to the adjustment of ink supply volume for two (2) or for more than four (4) color-inks.

7. The Advantages of the Present Invention

The ink supply control device for printing machines according to the present invention is characterized in that, an actual color component amount measuring portion respectively detects a total amount of each color component as an actual color component total amount as a result of measuring an actual printed zone where the basic-color-inks being incorporated are printed. In this way, each of the color-components including phenomena such as "dot gain" and/or "trapping" caused at the time of incorporating color-inks can be detected, thereby ink supply volume can be adjusted accurately.

Also, adjustment ink supply amounts of each of the basic-color-inks are respectively adjusted in accordance with a total differential amount of color components calculated with a color component amount difference calculating portion as a difference between the target color component total amount and the actual color component total amount, the amounts of primary-color-components and that of color-impurity-components in each of the basic-color-inks both detected by an independent color component amount measuring portion.

By adjusting the ink supply volume under consideration of both the color impurities and the primary-color-components contained in each of the basic-color-inks, it is thereby possible to avoid misadjustment in ink supply volume caused by the color-impurity-components contained in each of the basic-color-inks as well as performing much accurate ink supply control.

In addition, the independent color component amount measuring portion detects both an amount of the primary-color-component and that of the color-impurity-component contained in the basic-color-ink at each of the independent printed zones when the actual color component amount measuring portion detects an actual color component total amount.

Both the amount of the primary-color-component and that of the color-impurity-component can accurately be detected at all times even when the amount of the color-impurities varies according to the time measurement is taken during the printing processes because both the amount of the primary-color-component and that of the color-impurity-component are detected at every detection of the actual color component total amount. In this way, much more accurate ink supply control can be performed.

The ink supply control device for printing machines according to the present invention is characterized in that, an actual color component amount measuring portion respectively detects a total amount of each color component as an actual color component total amount as a result of measuring an actual printed zone where the basic-color-inks being incorporated are printed. In this way, each of the color-components including phenomena such as "dot gain" and/or "trapping" caused at the time of incorporating color-inks can be detected, thereby ink supply volume can be adjusted accurately.

Also, ink supply amounts of each of the basic-color-inks are respectively adjusted in accordance with a primary-color-component differential amount for each of the basic-color-inks defined according to a total differential amount of color components calculated with a color component amount difference calculating portion as a difference between the target color component total amount and the actual color component total amount, the amounts of primary-color-components and that of color-impurity-components in each of the basic-color-inks both detected by an independent color component amount measuring portion.

By adjusting the ink supply volume in accordance with the primary-color-component differential amount for each of the basic-color-inks defined under consideration of both the color impurities and the primary-color-components contained each of the basic-color-inks, it is thereby possible to avoid misadjustment in ink supply volume caused by the color-impurity-components contained in each of the basic-color-inks as well as performing much more accurate ink supply control.

Further, ink supply volume can accurately be adjusted with certainty because the primary-color-component differential amount for each of the basic-color-inks is defined according to Equation 1 using the total differential amount of color components, the amount of the primary-color-components, and the amounts of color-impurity-components.

In addition, the independent color component amount measuring portion detects both an amount of the primary-color-component and that of the color-impurity-component contained in the basic-color-ink at each of the independent printed zones when the actual color component amount measuring portion detects an actual color component total amount.

Both the amount of the primary-color-component and that of the color-impurity-component can accurately be detected all the time even when the amount of the color-impurities varies according to the time detection occurs during the printing processes because both the amount of the primary-color-component and that of the color-impurity-component are detected at every detection of the actual color component total amount. In this way, much more accurate ink supply control can be performed.

The ink supply control device for printing machines according to the present invention is characterized in that, ink supply of each basic-color-ink is adjusted in accordance with an ink adjusting value, the ink adjusting value being obtained based on the corresponding relations by using the primary-color-component differential amount calculated.

In this way, ink supply volume can be adjusted more quickly with high accuracy because the ink supply volume is adjusted based on the corresponding relations previously stored in the corresponding relations storing portion.

The ink supply control method for printing machines according to the present invention is characterized in that, a total amount of each color component is detected as an actual color component total amount as a result of measuring an actual printed zone where the basic-color-inks being incorporated are printed. In this way, each of the color-components including phenomena such as "dot gain" and/or "trapping" caused at the time of incorporating color-inks can be detected, thereby ink supply volume can be adjusted accurately.

Also, adjustment ink supply amounts of each of the basic-color-inks in accordance with the total differential amount of color components is calculated as a difference between the target color component total amount and the actual color component total amount, the amounts of primary-color-components and that of color-impurity-components being contained in each of the basic-color-inks.

By adjusting the ink supply volume under consideration of both the color impurities and the primary-color-components contained in each of the basic-color-inks, it is thereby possible to avoid misadjustment in ink supply volume caused by the color-impurity-components contained in each of the basic-color-inks as well as performing much more accurate ink supply control.

In addition, both an amount of the primary-color-component and that of the color-impurity-component contained in the basic-color-ink at each of the independent printed zones when the actual color component total amount is detected.

Both the amount of the primary-color-component and that of the color-impurity-component can accurately be detected at all times even when the amount of the color-impurities varies according to the time detection occurs during the printing processes because both the amount of the primary-color-component and that of the color-impurity-component are detected at every detection of the actual color component total amount. In this way, much more accurate ink supply control can be performed.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. An ink supply control device for independently adjusting supply amount of a plurality of basic-color-inks, each of the basic-color-inks including a primary-color-component and a color-impurity-component which is identical with a primary-color-component of other basic-color-ink, the control device comprising:

a target color component amount storing portion for respectively storing a total amount of each color component at a target printed zone as a target color component total amount, the target printed zone being a zone where the basic-color-inks being incorporated are printed under an optimum ratio, an actual color component amount measuring portion for respectively detecting a total amount of each color component as an actual color component total amount as a result of measuring an actual printed zone where the basic-color-inks being incorporated are printed;

an independent color component amount measuring portion for detecting both amounts of primary-color-component and that of color-impurity-component contained in the basic-color-ink at each of independent printed zones where the basic-color-inks are independently printed by respectively measuring the independent printed zones; and a color component amount difference calculating portion for calculating a total differential amount of color components between the target color component total amount and the actual color component total amount;

wherein the independent color component amount measuring portion detects both an amount of the primary-color-component and that of the color-impurity-component contained in the basic-color-ink at each of the independent printed zones when the actual color component amount measuring portion detects an actual color component total amount;

and wherein ink supply amounts of each of the basic-color-inks are respectively adjusted in accordance with the total differential amount of color components, the amounts of primary-color-components and that of color-impurity-components contained.

2. The ink supply control device in accordance with claim 1, wherein the basic-color-inks are color-inks corresponding respectively to cyan, magenta, and yellow.

3. The ink supply control device in accordance with claim 2, wherein the target printed zone and the actual printed zone are gray patches printed with the basic-color-inks corresponding to cyan, magenta, and yellow, the basic-color-inks being incorporated.

4. An ink supply control device for independently adjusting supply amount of a plurality of basic-color-inks corresponding to basic-colors Z1, Z2, . . . Zn, each of the basic-color-inks including a primary-color-component and a color-impurity-component which is identical with a primary-color-component of other basic-color-ink, the control device comprising:

a target color component amount storing portion for respectively storing a total amount of each color component at a target printed zone as a target color component total amount, the target printed zone being a zone where the basic-color-inks being incorporated are printed under an optimum ratio, an actual color component amount measuring portion for respectively detecting a total amount of each color component of the basic-color-inks as an actual color component total amount as a result of measuring an actual printed zone where the basic-color-inks being incorporated are printed;

an independent color component amount measuring portion for detecting both amounts of primary-color-component and that of color-impurity-component contained in the basic-color-ink at each of the independent printed zones where the basic-color-inks are independently printed by respectively measuring the independent printed zones; and a color component amount difference calculating portion for calculating a total differential amount of color components between the target color component total amount and the actual color component total amount;

wherein the independent color component amount measuring portion detects both an amount of the primary-color-component and that of the color-impurity-component contained in the basic-color-ink at each of the independent printed zones when the actual color component amount measuring portion detects an actual color component total amount;

and wherein a primary-color-component differential amount for each of the basic-color-inks is defined using the total differential amount of color components, the amount of the primary-color-component, and the amounts of color-impurity-component, and wherein ink supply amounts of each of the basic-color-inks are adjusted in accordance with the primary-color-component differential amount according to;

$$\begin{bmatrix} Z1' \\ Z2' \\ \vdots \\ Zn' \end{bmatrix} = \begin{bmatrix} Z1_{Z1}/Z1_{Z1} & Z2_{Z1}/Z2_{Z2} & \cdots & Zn_{Z1}/Zn_{Zn} \\ Z1_{Z2}/Z1_{Z1} & Z2_{Z2}/Z2_{Z2} & \cdots & Zn_{Z2}/Zn_{Zn} \\ \vdots & \vdots & \vdots & \vdots \\ Z1_{Zn}/Z1_{Z1} & Z2_{Zn}/Z2_{Z2} & \cdots & Zn_{Zn}/Zn_{Zn} \end{bmatrix}^{-1} \begin{bmatrix} \Delta Z1 \\ \Delta Z2 \\ \vdots \\ \Delta Zn \end{bmatrix}$$

Z1' is the primary-color-component differential amount of the basic-color-ink corresponding to the basic color Z1, Z2' is the primary-color-component differential amount of the basic-color-ink corresponding to the basic color Z2, Zn' is the primary-color-component differential amount of the basic-color-ink corresponding to the basic color Zn, $Z1_{z1}$ is the amount of the primary-color-component contained in the basic-color-ink corresponding to the basic color Z1, $Z1_{z2}$ is the amount of the color-impurity-component of the basic-color Z2 contained in the basic-color-ink corresponding to the basic color Z1, $Z1_{zn}$ is the amount of the color-impurity-component of the basic-color Zn contained in the basic-color-ink corresponding to the basic color Z1, $Z2_{z2}$ is the amount of the primary-color-component contained in the basic-color-ink corresponding to the basic color Z2, $Z2_{z1}$ is the amount of the color-impurity-component of the basic-color Z1 contained in the basic-color-ink corresponding to the basic color Z2, $Z2_{zn}$ is the amount of the color-impurity-component of the basic-color Zn contained in the basic-color-ink corresponding to the basic color Z2, $Zn_{zn}$ is the amount of the primary-color-component contained in the basic-color-ink corresponding to the basic color Zn, $Zn_{z1}$ is the amount of the color-impurity-component of the of the basic color Z1 contained in the basic-color-ink corresponding to the basic color Zn, $Zn_{z2}$ is the amount of the color-impurity-component of the basic-color Z2 contained in the basic-color-ink corresponding to the basic color Zn, $\Delta$ Z1 is the total differential amount of color component of Z1, $\Delta$ Z2 is the total differential amount of color component of Z2, and $\Delta$ Z3 is the total differential amount of color component of Z3.

5. The ink supply control device in accordance with claim 4, wherein the device further comprises a corresponding relations storing portion for previously storing corresponding relations between the primary-color-component differential amounts and ink adjusting values indicative of adjusting degrees of ink supply for each basic-color-ink, and wherein ink supply of each basic-color-ink is adjusted in accordance with an ink adjusting value, the ink adjusting value being obtained based on the corresponding relations by using the primary-color-component differential amount calculated.

6. The ink supply control device in accordance with claim 4, wherein the basic-color-inks are color-inks corresponding respectively to cyan, magenta, and yellow.

7. The ink supply control device in accordance with claim 6, wherein the target printed zone and the actual printed zone are gray patches printed with the basic-color-inks corresponding to cyan, magenta, and yellow, the basic-color-inks being incorporated.

8. A method of independently adjusting supply amount of a plurality of basic-color-inks, each of the basic-color-inks including a primary-color-component and a color-impurity-component which is identical with a primary-color-component of other basic-color-ink, the method comprising the steps of:

respectively storing a total amount of each color component at a target printed zone as a target color component total amount, the target printed zone being a zone where the basic-color-inks being incorporated are printed under an optimum ratio;

respectively detecting a total amount of each color component as an actual color component total amount as a result of measuring an actual printed zone where the basic-color-inks being incorporated are printed;

detecting both an amount of the primary-color-component and that of the color-impurity-component contained in the basic-color-ink at each of the independent printed zones where the basic-color-inks are independently printed by respectively measuring the independent printed zones when the actual color component amount is detected;

calculating a total differential amount of color components between the target color component total amount and the actual color component total amount; and respectively adjusting ink supply amounts of each of the basic-color-inks in accordance with the total differential amount of color components, the amounts of primary-color-components and that of color-impurity-components being contained.

9. The ink supply control device in accordance with claim 8, wherein the basic-color-inks are color-inks corresponding respectively to cyan, magenta, and yellow.

10. The ink supply control device in accordance with claim 9, wherein the target printed zone and the actual printed zone are gray patches printed with the basic-color-inks corresponding to cyan, magenta, and yellow, the basic-color-inks being incorporated.

* * * * *